J. J. Doughty.
Spring for Gearing.

No. 92,433. Patented Jul. 13, 1869.

Inventor:
J. J. Doughty,
by his atty.

Witnesses.
C. G. Page, Jr.

United States Patent Office.

J. J. DOUGHTY, OF LAKE CITY, MINNESOTA.

Letters Patent No. 92,433, dated July 13, 1869.

SPRING FOR STEADYING THE MOTION OF MILLSTONES.

The Schedule referred to in these Letters Patent and making part of the same.

*To whom it may concern:*

Be it known that I, J. J. DOUGHTY, of Lake City, in the county of Wabasha, and State of Minnesota, have invented certain new and useful Improvements in Springs for Giving Steady Motion to Millstones, and for other purposes; and I hereby declare the following to be a full, clear, and exact description of the same, reference being had to the accompanying drawings, in which—

My invention relates more particularly to gearing for actuating millstones, but is applicable in any connection where a train of wheels for transmitting motion is employed.

My object is to prevent the backlash or reaction of one wheel upon the other, produced by irregularities in their velocity, where the moving-power is not uniform and the load or resistance is variable.

This is especially to be guarded against with millstones, whose motion, in order to produce the best results, should be smooth and steady.

To this end, I combine with the crown or other wheel, and the millstone-shaft to which it gives motion, one or more rubber springs, in the manner hereinafter described, so that the motion of the wheel shall be communicated to the shaft through the medium of said springs.

The arrangement of the latter is such that they expand or are compressed to conform to the varied movement of the teeth or shaft, so that the "backlash" is expended to a great extent upon them, and not upon the wheel or shaft; and the latter, consequently, is caused to revolve smoothly and evenly.

To enable those skilled in the art to understand and use my invention, I will now proceed to describe the manner in which the same is or may be carried into effect, by reference to the accompanying drawings.

A represents the shaft to which motion is to be imparted.

Upon its lower end is mounted a sleeve, $a$, the base $b$ of which is enlarged so as to form a shoulder, or base, upon which rests the pinion B, which encircles the sleeve, although it is not keyed or immovably fastened thereto.

Upon the under side of the pinion, and about diametrically opposite each other, are mounted two boxes, $c\ c$, in which are placed blocks of vulcanized rubber $d$, or equivalent elastic material.

Arms $f\ f$ project from the hub or base $b$, occupying a position thereon corresponding to that of the boxes on the pinion.

Figure 1:
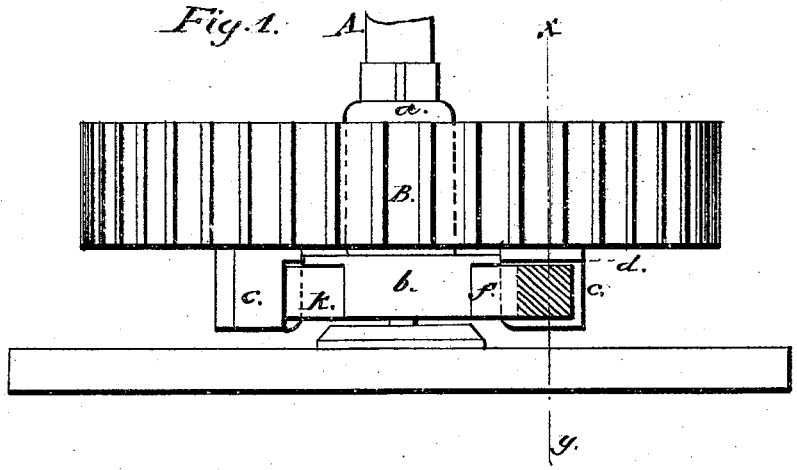
Figure 1 represents a side elevation of a gear-wheel, to which my improvements are applied.
Figure 2:
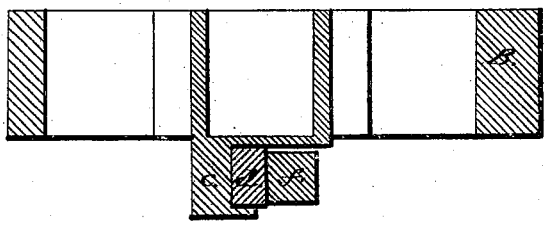
Figure 2 is a section on the line $x\ y$, fig. 1.
Figure 3:
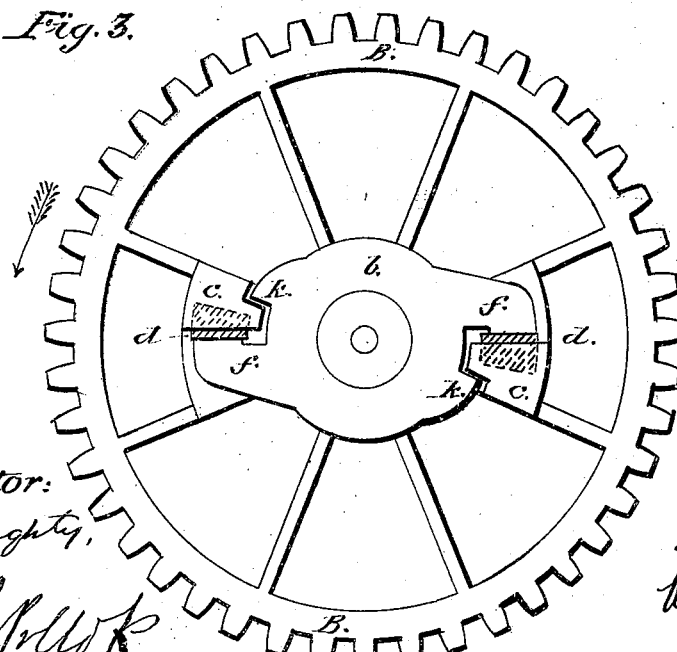
Figure 3 is a plan view of the wheel, looking from beneath.

The arrangement of the boxes and arms is such, that when the pinion rests on the base of the sleeve $a$, the rubber spring in each box will bear against the contiguous face of the arm adjoining it, as plainly shown in fig. 3.

If the wheel be revolved in the direction of the arrow, it will be seen that the boxes and their rubber springs or cushions engage with the arms, and thus cause the shaft to move in unison with the wheel.

In order to prevent the backward movement of the pinion, which would separate the boxes from their arms, a clutch, or projection, $k$, is formed on the hub $b$, near each arm $f$, the space between each arm and clutch constituting a recess, in which the end of the box is received and held.

When the pinion is revolved as indicated in fig. 3, the rubber springs press against the arms of the hub, and impart the uniform motion of the wheel to the shaft. Any irregularities of motion, however, resulting from the momentary increase or decrease of the velocity of the wheel or shaft, instead of being directly imparted by one to the other, and thus causing the "backlash," will induce a greater or less pressure upon the rubber springs, and thus cause the latter to be more or less compressed.

The motion, therefore, of the shaft will be smooth and even, and all irregularities will be "taken up" or compensated for by the spring.

It is manifest that the arrangement of parts herein shown may be reversed, the boxes being formed on the hub $b$, and the arms on the pinion A, and also that the springs may be applied on either face of the pinion.

It will also be understood that the springs can be applied in any connection where gear-wheels are employed to transmit motion.

Any other suitable elastic or spring-device for effecting the result above named may be employed, instead of vulcanized rubber, but I much prefer the latter, as being by far the best fitted for practical use.

Having now described my invention, and the manner in which the same is or may be carried into effect,

What I claim, and desire to secure by Letters Patent, is—

1. The combination, with the pinion, or wheel and shaft upon which it is mounted, as described, of the arms $f$ and the rubber springs and boxes in which the same are held, constructed, and arranged, upon the exterior of the said wheel, in the manner and for the purposes herein shown and specified.

2. In combination with the parts claimed in the preceding clause, the clutches $k$, for preventing the backward movement of the pinion, under the arrangement and for operation as herein shown and set forth.

In testimony whereof, I have signed my name to this specification, before two subscribing witnesses.

J. J. DOUGHTY.

Witnesses:
S. B. MUNSON, Jr.,
J. A. McBRIDE.